(12) United States Patent
Feng et al.

(10) Patent No.: US 9,703,854 B2
(45) Date of Patent: Jul. 11, 2017

(54) DETERMINING CRITICALITY OF A SQL STATEMENT

(71) Applicant: International Business Machines Corporation, Armonk, NY (US)

(72) Inventors: Hao H. H. Feng, Beijing (CN); Shuo B J. Li, Beijing (CN); Sheng Yan Sun, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 14/453,201

(22) Filed: Aug. 6, 2014

(65) Prior Publication Data

US 2015/0088913 A1 Mar. 26, 2015

(30) Foreign Application Priority Data

Sep. 26, 2013 (CN) .......................... 2013 1 0446584

(51) Int. Cl.
*G06F 7/00* (2006.01)
*G06F 17/30* (2006.01)

(52) U.S. Cl.
CPC .............................. *G06F 17/30595* (2013.01)

(58) Field of Classification Search
CPC ......... G06F 17/30595; G06F 17/30539; G06F 21/577
USPC ........................................................ 707/751
See application file for complete search history.

(56) References Cited

U.S. PATENT DOCUMENTS

| | | | |
|---|---|---|---|
| 7,698,441 | B2 | 4/2010 | Dettinger et al. |
| 7,711,750 | B1 | 5/2010 | Dutta et al. |
| 7,774,361 | B1 | 8/2010 | Nachenberg et al. |
| 8,046,374 | B1 | 10/2011 | Bromwich |
| 8,474,036 | B2 | 6/2013 | Markovich |
| 2004/0068661 | A1* | 4/2004 | Dettinger ............ G06F 21/6227 726/1 |
| 2004/0260947 | A1* | 12/2004 | Brady ................. H04L 63/1425 726/23 |
| 2005/0289102 | A1* | 12/2005 | Das ........................ G06Q 50/16 |

(Continued)

OTHER PUBLICATIONS

"Specifying and Querying Classification and Privacy Enforcement for Sensitive Data in Database Columns", Disclosed Anonymously, www.ip.com; IPCOM000207297D, May 25, 2011, 5 pages.

(Continued)

*Primary Examiner* — Binh V Ho
(74) *Attorney, Agent, or Firm* — Francis Lammes; Stephen J. Walden, Jr.; Reza Sarbakhsh (57) ABSTRACT

The present invention discloses a mechanism for determining criticality of a SQL statement. A plurality of elements in the SQL statement is extracted. A score of the SQL statement is calculated based on a correlation relation among respective elements in the plurality of elements and base scores of the respective elements. The criticality of the SQL statement is determined based on the score of the SQL statement. In this way, a database administrator only needs to define a small number of rules according his own needs. In the meantime, the mechanism automatically analyzes a received simple or complex SQL statement according to the small number of rules defined by the user to determine its criticality, without missing any critical SQL statement, and thereby protect security of data in the database.

18 Claims, 2 Drawing Sheets

(56) References Cited

U.S. PATENT DOCUMENTS

| | | | | |
|---|---|---|---|---|
| 2008/0046964 A1* | 2/2008 | Muralidharan | ..... | G06F 21/6227 726/1 |
| 2009/0024425 A1* | 1/2009 | Calvert | ................. | G06Q 10/06 705/7.25 |
| 2009/0328217 A1* | 12/2009 | Markovich | ......... | G06F 21/6227 726/23 |
| 2010/0257116 A1* | 10/2010 | Mehta | ................... | G06Q 10/06 705/348 |
| 2011/0119251 A1* | 5/2011 | Yu | .......................... | G06F 9/505 707/719 |
| 2012/0023586 A1* | 1/2012 | Flickner | ............ | G06F 17/30424 726/25 |
| 2015/0381540 A1* | 12/2015 | Sargent | ................. | G06Q 10/10 709/206 |

OTHER PUBLICATIONS

Bockermann, Christian et al., "Learning SQL for Database Intrusion Detection Using Context-Sensitive Modelling", Proceedings of the 6th International Conference on Detection of Intrusions and Malware, and Vulnerability Assessment (DIMVA'2009), Como, Italy, Jul. 9-10, 2009, pp. 196-205.

Dorai, Ramakanth et al., "SQL Injection-Database Attack Revolution and Prevention", Journal of International Commercial Law and Technology (JICLT), vol. 6, Issue 4 (2011), (no month and day available for date), pp. 224-231.

Halfond, William G. et al., "Using Positive Tainting and Syntax-Aware Evaluation to Counter SQL Injection Attacks", SIGSOFT'06/FSE-14, http://www-dev.ccs.neu.edu/home/pete/pub/fse-2006.pdf, Portland Oregon, Nov. 5-11, 2006, 11 pages.

Shar, Lwin K. et al., "Mining Input Sanitization Patterns for Predicting SQL Injection and Cross Site Scripting Vulnerabilities", Proceedings of the 34th International Conference on Software Engineering (ICSE'12), Zurich, Switzerland, Jun. 2-9, 2012, pp. 1293-1296.

Wu, Haiyan et al., "Test SQL Injection Vulnerabilities in Web Applications Based on Structure Matching", International Conference on Computer Science and Network Technology (ICCSNT), vol. 2, http://info.cic.tsinghua.edu.cn/upload_file/_temp/1331170951556/1331170951556.pdf, Dec. 24-26, 2011, 4 pages.

\* cited by examiner

DETERMINING CRITICALITY OF A SQL STATEMENT

BACKGROUND

The present invention relates to a Structured Query Language (SQL), and more specifically, to a method and device for determining criticality of a SQL statement.

SQL is a data query language for a database. A user can access the database by a series of SQL statements, in order to manipulate, e.g., query, update or delete, data in the database. On the other hand, it is very important for a database administrator to ensure security of the data in the database, so there is a need to determine criticality of the SQL statements executed on the data in the database, that is, to determine whether the SQL statements are likely to damage the security of the data in the database. Specifically, for a database containing confidential information, especially a commercial database, the user may intentionally or unintentionally access the database using a SQL statement which is directly or potentially critical, so that the data in the database are leaked to unauthorized persons, or are improperly modified or deleted, causing damage to the security of the data in the database. Therefore, when a SQL statement to be executed on the database is received, the database administrator needs to analyze the criticality of the SQL statement, so as to take an appropriate action when necessary, such as prohibit execution of the SQL statement.

Conventionally, the user can set a series of security rules according to his own needs, and the security rules define which SQL statements are insecure or critical, so that when the received SQL statement complies with the definition of the security rules, the SQL statement is identified as an insecure statement. However, since there are a variety of SQL statements, the user needs to set security rules as many as possible to define various insecure SQL statements, which brings a heavy burden to the user. In addition, it is hard for the security rules set by the user to cover all insecure SQL statements, and once a certain insecure SQL statement is not covered by the security rules, it will not be identified and thus will damage the security of the data in the database.

SUMMARY

In view of the above problem, the present invention is proposed. An object of the present invention is to provide a method and device for determining criticality of a SQL statement, which can accurately analyzing and predicting the criticality of the SQL statement to be executed on the database in accordance with characteristics of the SQL statement per se, so that a database administrator can take appropriate measures according to the criticality. Here, the criticality of the SQL statement may refer to a possibility that the SQL statement causes damage to security of data in the database, and the greater the criticality is, the greater the possibility is.

According to an aspect of the present invention, there is provided a method for determining criticality of a SQL statement, comprising: extracting a plurality of elements in the SQL statement; calculating a score of the SQL statement based on a correlation relation among respective elements in the plurality of elements and base scores of the respective elements; and determining the criticality of the SQL statement based on the score of the SQL statement.

According to another aspect of the present invention, there is provided a device for determining criticality of a SQL statement, comprising: an extracting apparatus configured to extract a plurality of elements in the SQL statement; a calculating apparatus configured to calculate a score of the SQL statement based on a correlation relation among respective elements in the plurality of elements and base scores of the respective elements; and a determining apparatus configured to determine the criticality of the SQL statement based on the score of the SQL statement.

With the method and device according to the above aspects of the present invention, it is possible to score, according to elements included in a SQL statement (e.g., a table and/or a field in the database and an action to be executed by the SQL statement), the SQL statement by using base scores of the respective elements, and then determine whether the SQL statement is critical or not based on the score of the SQL statement, where the base scores of the respective elements can be predetermined according to a small number of rules defined by the user, characteristics of the database per se, and historical SQL statements executed on the database. In this way, the database administrator only needs to define the small number of rules according to his own needs. In the meantime, the method and device according to the above aspects of the present invention can automatically analyze the received simple or complex SQL statement according to the small number of rules defined by the user to determine its criticality without missing any critical SQL statement, thereby protect the security of the data in the database.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
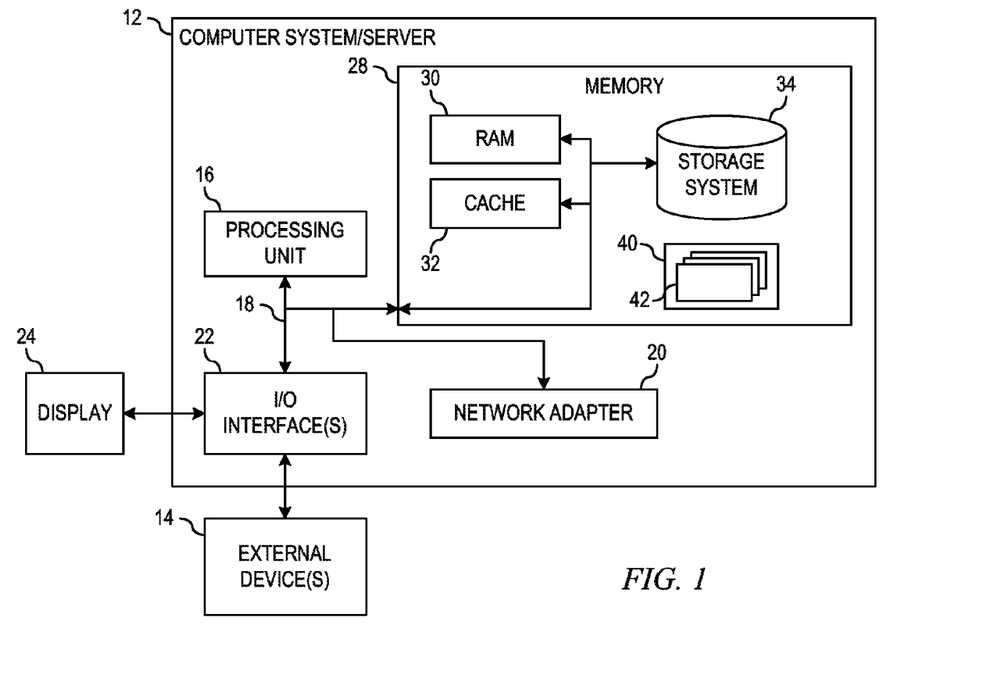
FIG. 1 shows a block diagram of an exemplary computer system/server which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Hereinafter, a method and device for determining criticality of a SQL statement according to embodiments of the present invention will be described with reference to the drawings. The method and device can be used to determine criticality of a SQL command which manipulates (e.g., queries, updates, deletes, or the like) a table and/or a field in the table in a database. As stated above, the criticality may refer to a possibility that the SQL statement may cause damage to security of data in the database.

As known in the art, the database may include a plurality of tables to store different types of data, and each of the tables includes at least one field. In these tables, data in some tables are not so important, while data in some tables are important or sensitive, and their security should be guaranteed. For example, a database created by a company's personnel department may include Tables 1 to 5 below, where Table 1 is an employee table (emp) for storing a list of names of employees of the company, Table 2 is an account table (account) for storing bank accounts of the respective employees, Table 3 is a salary table (salary) for storing salaries of the respective employees, Table 4 is a department table (department) for storing information about departments of the company, Table 5 is a job table (job) for storing data related to various job positions of the company, and each of the tables has at least one field. For the personnel department, data stored in Table 2 and Table 3 are relatively important, and data stored in the other tables are relatively unimportant.

TABLE 1

| emp | |
|---|---|
| empid | ID of employee |
| empname | Name of employee |
| empaddr | Address of employee |
| deptid | ID of employee's department |
| manageid | ID of employee's manager |
| . . . | . . . |

TABLE 2

| account | |
|---|---|
| empid | ID of employee |
| accountid | ID of account |
| enable | Whether the account is in use |
| . . . | . . . |

TABLE 3

| salary | |
|---|---|
| empid | ID of employee |
| salary | Salary per month |
| bonus | Bonus per month |
| last_update | Modification log |
| . . . | . . . |

TABLE 4

| department | |
|---|---|
| deptid | ID of department |
| deptname | Name of department |
| last_update | Modification log |
| . . . | . . . |

TABLE 5

| job | |
|---|---|
| job_id | ID of job |
| job_title | Title of job |
| min_salary | Minimum salary of the job |
| max_salary | Maximum salary of the job |
| . . . | . . . |

The user can manipulate, e.g., query, update, alter or the like, a table and a field of the table in the database by using at least one SQL statement. In order to ensure security of data stored in the respective tables, in the embodiment of the present invention, the criticality of the SQL statement can be determined according to an action to be executed by the SQL statement and the table and/or the field of the table in the database which the SQL statement is directed at, so that the database administrator can take an appropriate action according to the criticality of the SQL statement.

Specifically, in the embodiment of the present invention, when the SQL statement to be executed on the database is received, a plurality of elements in the SQL statement can be extracted, and a score of the SQL statement may be calculated according to base scores of the respective elements, and then the criticality of the SQL statement is determined based on the score of the SQL statement. Therefore, the base scores of the respective elements that may appear in the SQL statement should be determined in advance.

As known in the art, the elements that may appear in the SQL statement can include at least one of a database object and a field which the SQL statement is directed at, an action to be executed by the SQL statement and so on. The database object may include, for example, a table, a function and/or a trigger, etc. The field refers to a field of a table in the database. The action may include an action defined by a Data Definition Language (DDL), such as Create, Alter, Drop or Truncate, etc., and/or an action defined by a Data Manipulation Language (DML), such as Select, Insert, or Update, etc. Because the embodiment of the present invention is to protect the security of the data stored in the tables, it is possible to take the tables only into account for the database object. Therefore, base scores of the respective tables stored in the database, base scores of fields of the respective tables, and base scores of actions allowed to be executed on the database (i.e., actions which the SQL statement can execute on the database) are defined in the embodiment of the present invention. These base scores can be stored in a base score table for query when necessary.

Hereinafter, a method for setting the base scores will be described in detail. In the embodiment of the present invention, the base scores are set in a range between a minimum score $S_{min}$ and a maximum score $S_{max}$, where $S_{min} < S_{max}$. Specific values of $S_{min}$ and $S_{max}$ can be set flexibly according to needs. For example, $S_{min}$ can be set to a value far less than 1 (e.g., 0.1), and $S_{max}$ can be set to 1. A base score of an element can indicate importance of the element. In the embodiment of the present invention, the higher the base score is, the more important the element is. Of course, this is not limitative, and in other embodiments, it is possible that the lower the base score is, the more important the element is.

Briefly, the base scores of the respective tables and the base scores of the fields of the respective tables can be determined according to a user-specified rule and a correlation relation among the respective tables in the database, where the correlation relation refers to a correlation relation formed by correlating two tables via a foreign key, or a correlation relation formed by two tables which appear in a same historical SQL statement executed on the database and are correlated via at least one field. The base scores of the actions allowed to be executed on the database can be specified by the database administrator.

First of all, a method for setting the base scores of the respective tables and the base scores of the fields of the respective tables will be described.

Specifically, the database administrator can define at least one rule, and set a base score of the rule (referred to as a first base score hereinafter for convenience of description). The rule can include a table and/or a field in the database, and the base score of the table and/or the field is equal to the score of the rule, i.e., the first base score.

As described above, among various data stored in the database, some are important, whereas some are not important. The important data are stored in a table (specifically, a field of the table). The database administrator can determine the important data according to his own needs, and specify the table and/or the field where the important data are stored by defining the above rule. In addition, by setting the score of the rule, the database administrator can set the base score of the table and/or the field where the important data are stored, so as to reflect importance of the data in the table and/or the field by using the base score. It is conceivable that the first base score which the database administrator sets for the table and/or the field where the important data are stored is greater than $S_{min}$. When a plurality of rules are defined, the respective rules may have different first base scores in accordance with different importance of data in tables and/or fields contained in the respective rules. Moreover, if the rule includes a table in the database, besides that the table per se has the first base score, all fields in the table will inherit the table's base score and thus also have the first base score. Of course, this is not limitative, and in other embodiments, a part of fields in the table can be selected according to characteristics of the respective fields in the table and/or the database administrator's needs to inherit the base score of the table, and the other fields do not inherit the base score, but can be set to another score, e.g., a second base score described later.

In the example illustrated by the above Tables 1 to 5, it is assumed that the bank account data of the respective employees stored in Table 2 and the salary data of the employees stored in Table 3 are important data, and the salary data is more important than the bank account data, then a personnel manager which is the database administrator can, for example, define the following two rules to specify the tables and the fields in which these important data are stored:

Rule 1: select salary, bonus from salary→score: 0.8
Rule 2: select accountid from account→score: 0.3

Rule 1 includes Table 3 "salary" in the database and the fields "salary" and "bonus" in Table 3, and Rule 2 includes Table 2 "account" in the database and the field "accountid" in Table 2. In addition, the personnel manager sets the base score of Rule 1 to 0.8, and sets the base score of Rule 2 to 0.3. Therefore, the base scores of Table 3 "salary" and the fields "salary" and "bonus" in Table 3 are 0.8, and the base scores of Table 2 "account" and the field "accountid" in Table 2 are 0.3. Additionally, remaining fields "empid" and "last_update" in Table 3 "salary" will inherit the base score of Table 3 and thus have a base score of 0.8, and remaining fields "empid" and "enable" in Table 2 will inherit the base score of Table 2, and thus have a base score of 0.3. It is to be noted that specific forms of the rules defined by the database administrator can be flexibly changed, and are not limited to the form similar to a SQL statement as adopted in the above Rules 1 and 2. For example, the database administrator can merely list in the rules relatively important tables and/or fields, and set base scores for these tables and/or fields.

For remaining tables, except the tables specified by the above rules, in the database, their base scores can be determined according to their correlation relation with the tables specified by the above rules. Correspondingly, respective fields in the remaining tables will inherit the base scores thereof. For example, for the remaining tables, it can be determined whether they have the correlation relation with the tables specified in the above rules. If the correlation relation exists, the base scores of the remaining tables can be set to those which are the same as the base scores of the tables specified in the above rules, i.e., the first base scores, and correspondingly, the fields of the remaining tables will inherit the first base scores. On the contrary, if the correlation relation does not exist, the base scores of the remaining tables can be set to the second base scores, and correspondingly, the fields of the remaining tables will inherit the second base scores. Because the data in the remaining tables are not as important as the data in the tables specified by the above rules, the second base scores can be set to be smaller than the first base scores. For example, the second base scores can be set to the minimum score $S_{min}$.

Specifically, as described above, the correlation relation refers to a correlation relation formed by correlating two tables via a foreign key, hereinafter referred to as a structural correlation relation, or a correlation relation formed by two tables which appear in a same historical SQL statement executed on the database and are correlated via at least one field, hereinafter referred to as a business correlation relation. The structural correlation relation can be determined by analyzing structures of the respective tables in the database. For example, if two tables in the database are correlated via a foreign key, they have a structural correlation relation. In the above example of Tables 1 to 5, both Table 1 and Table 2 have the field "empid", which is a primary key of Table 2 and meanwhile is a foreign key linked to Table 1, so Table 1 and Table 2 are correlated with each other via the foreign key "empid", and thus have the structural correlation relation. Therefore, Table 1 and its respective fields have a base score which is the same as Table 2. Furthermore, the business correlation relation can be determined by analyzing SQL statements executed on the database in a past period of time (i.e., historical SQL statements). For example, if two tables of the database appear in a same historical SQL statement at the same time and are correlated via at least one field, the two tables have the business correlation relation. Here, the historical SQL statements executed on the database in the past period of time can be stored in a historical SQL statement library for future use when necessary. In the above example of Table 1 to Table 5, it is assumed that a certain historical SQL statement is:

select manageid, deptname
   from emp, department
   where emp.deptid=department.deptid In the historical SQL statement, Table 1 "emp" and Table 4 "department" appear at the same time, and the two tables are correlated via the field "deptid", so the two tables have the business correlation relation. Table 4 and its fields have a base score which is the same as that of Table 1. It is to be noted that, there may be a case where the database administrator sets different base scores for two tables by defining the rule, but the two tables have the aforesaid correlation relation and thus should have the same base score. When such a case occurs, the base scores of the two tables can be set to those set respectively by the database administrator and their correlation relation can be ignored, or the base scores set by the database administrator can be ignored and the two tables can be set to have the same base score.

In this way, the base scores of all tables and/or fields in the database can be determined based on the rules specified by the database administrator and the correlation relation among the respective tables in the database, and these base scores can be stored in a base score table.

Next, a method for setting the base score of the action allowed to be executed on the database will be described. Briefly, the base score of the action allowed to be executed on the database can be specified by the database administrator. As described above, the action allowed to be executed on the database may include the action defined by the Data Definition Language (DDL), such as Create, Alter, Drop, or Truncate, etc., and/or the action defined by the Data Manipulation Language (DML), such as Select, Insert, or Update, etc. Among these actions, some, e.g. the Truncate action, may impose a great impact on the data in the database, while some, e.g., the Select action, may not affect the data greatly. The database administrator may specify different base scores for various actions in accordance with a degree of the impact which these actions may impose on the data. For example, the database administrator can assign the maximum score $S_{max}$ to the Truncate action, and assign a smaller base score (e.g., 0.2) to the Select action. Of course, the user may not specify the base scores for the actions, in which case the base scores of the actions can be set to the above second base score by default. Then, the base scores of these actions can be stored in the base score table.

Optionally, a weighting factor applied to a base score of a field based on a position of the field in the SQL statement can be set in the base score table. The weighting factor can be set for all or a part of the fields of the respective tables in the database. The setting of this weighting factor is in view of a fact as follows: a field may appear in a conditional region (e.g., a "where" clause) of a SQL statement, or may appear in other regions of the SQL statement; however, if the field appears in the conditional region, the object which the SQL statement manipulates are more targeting than the case where the field appears in other regions, and therefore may have greater criticality. In the embodiment of the present invention, when the field is located in the conditional region of the SQL statement, the base score of the field can be increased, for example, the base score can be applied a weighting factor greater than 1, whereas when the field is located in other regions than the conditional region of the SQL statement, the base score of the field may remain unchanged, for example, the base score can be applied a weighting factor equal to 1.

With the above setting operation, the base score table containing the base scores of the respective tables stored in the database, the base scores of the fields of the respective tables, and the base scores of the actions allowed to be executed on the database can be generated, so that the criticality of the SQL statement can be determined by using the base score table in accordance with the method described later. It is to be appreciated that the base score table mentioned here is merely an example, and the base scores can be stored in any other proper manner. In addition, the process of performing the above setting operation to generate the base score table is not a premise for the method for determining criticality of a SQL statement according to the embodiment of the present invention, and it is also possible to receive the above base score table which has been set in advance from outside, instead of performing the above setting operation before the method for determining criticality of a SQL statement according to the embodiment of the present invention.

Additionally, the base score table can be updated regularly or irregularly, to improve rationality of the base scores stored therein. Specifically, the historical SQL statements stored in the historical SQL statement library may change over time. The business correlation relation among the respective tables in the database can be determined regularly or irregularly based on the historical SQL statements in the latest historical SQL statement library, and then the base scores of the respective tables can be determined based on the correlation relation so as to make the base scores more reasonable.

Hereinafter, the method for determining criticality of a SQL statement according to the embodiment of the present invention will be described with reference to FIG. 2.

Figure 2:
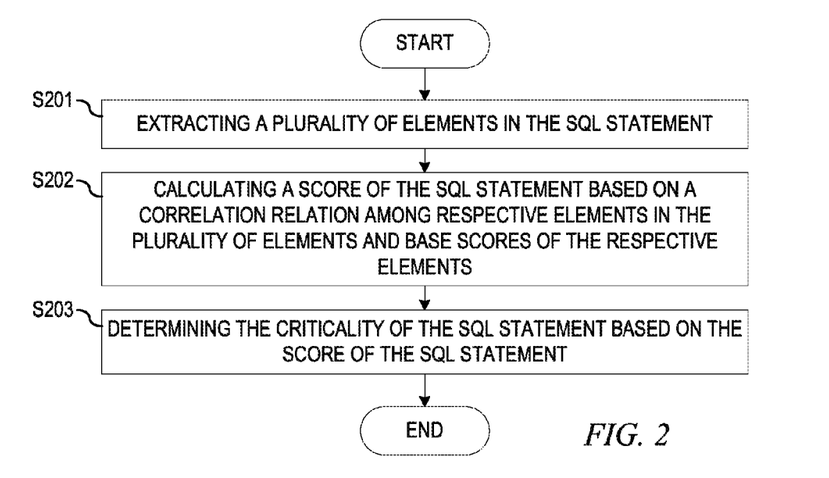
FIG. 2 shows a flowchart of a method for determining criticality of a SQL statement according to an embodiment of the present invention.

As shown in FIG. 2, when the SQL statement to be executed on the database is received, a plurality of elements in the SQL statement can be extracted in step S201. In the embodiment of the present invention, the plurality of elements include at least one of a table and a field in the database which the SQL statement is directed at, and an action to be executed by the SQL statement. Since all executable SQL statements comply with a standardized SQL syntax specification, a structure of the SQL statement can be analyzed according to the SQL syntax specification, so as to extract the plurality of elements in the SQL statement. For example, the respective elements in the SQL statement can be extracted by analyzing a predicate, a conditional clause and so on of the SQL statement. The specific manner of extracting the elements by analyzing the structure of the SQL statement is well known in the art, and a detailed description thereof is omitted here.

Next, in step S202, a score of the SQL statement can be calculated based on a correlation relation among the respective elements in the plurality of extracted elements of the SQL statement and base scores of the respective elements.

Specifically, first of all, a base score table can be looked up to determine the respective base scores of the plurality of elements. Here, for a table and an action involved in the SQL statement, the base scores obtained by looking up the base score table can be determined as their base scores. For a field involved in the SQL statement, if the above weighting factor is stored in the base score table, a product of the base score of the field obtained by looking up the base score table and its weighting factor can be determined as its base score, on the contrary, if the above weighting factor is not stored in the base score table, the base score obtained by looking up the base score table can be determined as its base score directly.

Then, it can be determined whether there is a correlation relation between any two of the plurality of elements. In the embodiment of the present invention, it can be determined whether there is the correlation relation between any two elements of the SQL statement by determining whether there is the correlation relation between any two tables, any two fields, and a table and a field involved in the SQL statement. As mentioned above, the correlation relation may be a structural correlation relation or a business correlation relation. Specifically, it can be determined that the correlation relation exists between any two elements of the SQL statement in the following cases: the SQL statement involves two tables, and the above structural correlation relation or the above business correlation relation exists between the two tables; the SQL statement involves a table and a field, and the above structural correlation relation or the above business correlation relation exists between the table and a table to which the field belongs; or the SQL statement involves two fields, and the above structural correlation relation or the above business correlation relation exists between tables to which the two fields belong.

If the correlation relation does not exists between any two elements in the SQL statement, i.e., the respective elements of the SQL statement are independent of each other, the score of the SQL statement can be set to a first value which may be a maximum one of the base scores of the respective elements.

On the other hand, if the correlation relation exists between at least two elements in the SQL statement, the score of the SQL statement can be set to a second value which is greater than the first value (namely, the maximum one of the base scores of the respective elements) to indicate that the SQL statement corresponding to such a case has greater criticality. The reason for such a setting is that, as compared with the case where the correlation relation does not exist among the respective elements in the SQL statement, if the correlation relation exists between at least two elements in the SQL statement, this means that the SQL statement will acquire more information correlated with each other, so that the SQL statement has a greater possibility of causing damage to the data in the database, and thus has higher criticality.

In this case, the second score can be set in many manners. For example, the second score may be set to a multiple greater than 1 of the maximum one of the base scores of the respective elements. Alternatively, assuming that the SQL statement has N elements (N≥2), where a base score of the $i^{th}$ element is $S_i$ (1≤i≤N), the score of the SQL statement, $S_{SQL}$, can be calculated by the following equation:

$$S_{SQL} = 1 - \prod_{i=1}^{N} (1 - S_i)$$

so that when the correlation relation exists between at least two elements in the SQL statement, the SQL statement will get a higher criticality score.

Referring further to FIG. 2, in step S203, the criticality of the SQL statement can be determined based on the score of the SQL statement Specifically, the database manager can set one or more threshold values in advance. Thus, in step S203, the score of the SQL statement can be compared with the threshold value(s) to determine the criticality of the SQL statement. For example, in a case where one threshold value is set, when the score of the SQL statement is greater than the threshold value, the SQL statement can be set to be critical, otherwise the SQL statement can be set to be not critical. In a case where a plurality of threshold values are set, the criticality of the SQL statement can be determined hieratically based on which two thresholds the score of the SQL statement falls between.

Thus, the criticality of the SQL statement can be determined by using the above method, so that a corresponding action can be performed subsequently according to the criticality of the SQL statement to ensure the security of the data in the database. For example, in the case where one threshold is set as described above, if the SQL statement is determined to be critical, the SQL statement can be prohibited to be executed, or an identity of an initiator of the SQL statement can be requested to be authenticated; in the case where a plurality of threshold values are set as described above, one or more actions can be set for each level of the criticality, so that a corresponding action(s) is executed according to the level of the criticality of the SQL statement.

Hereinafter, a device for determining criticality of a SQL statement according to an embodiment of the present invention will be described with reference to FIG. 3. The device can execute the method described above with reference to FIG. 2. Since details of operations executed by the device are the same as the method described above, in other words, the respective details of the method described above are also applicable to the device, only a brief description of the device will be given herein, and a detailed description of the same details will be omitted.

Figure 3:
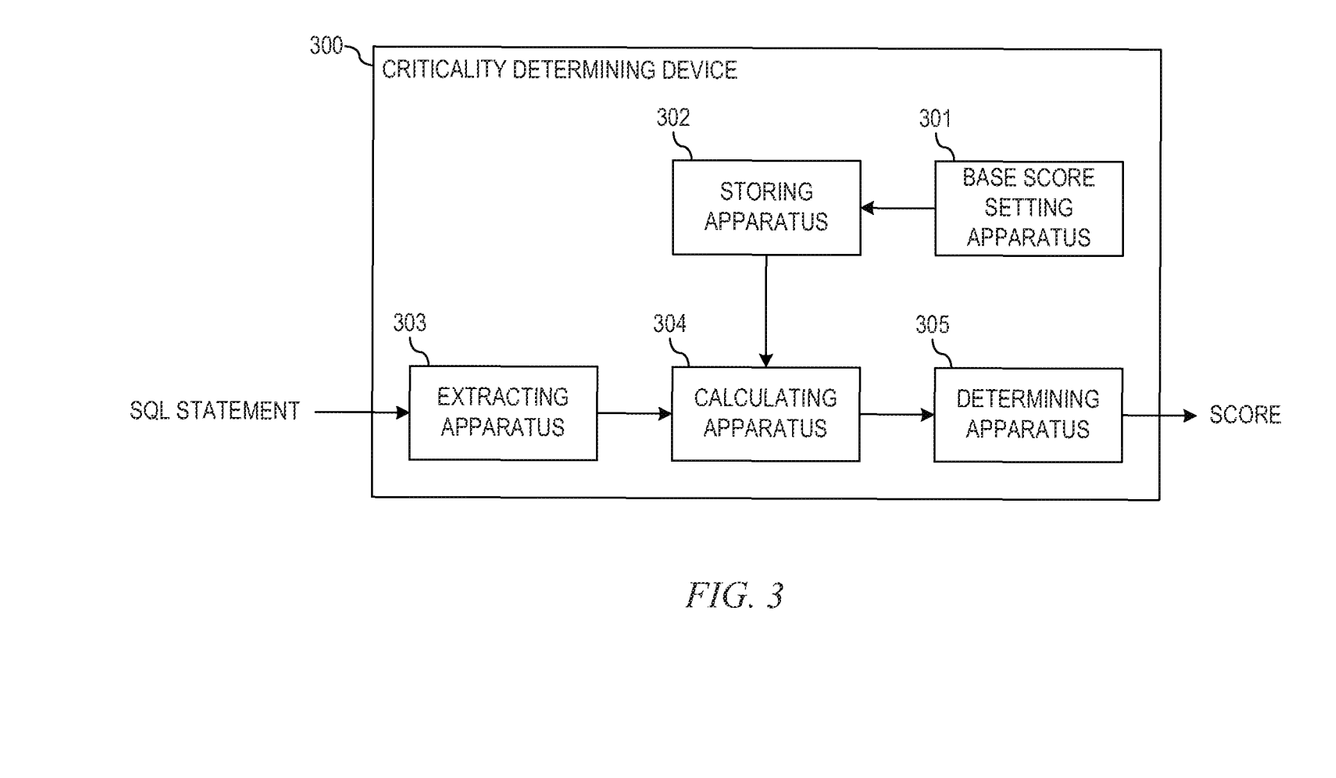
FIG. 3 shows a block diagram of a device for determining criticality of a SQL statement according to an embodiment of the present invention.

As shown in FIG. 3, the device 300 for determining the criticality of the SQL statement (hereinafter referred to as criticality determining device) according to the embodiment of the present invention comprises a base score setting apparatus 301, a storing apparatus 302, an extracting apparatus 303, a calculating apparatus 304, and a determining apparatus 305.

The base score setting apparatus 301 sets base scores of respective tables in the database, base scores of fields of the respective tables, and a base scores of an action allowed to be executed on the database, and stores the base scores in a base score table.

Specifically, as stated above, the base score setting apparatus 301 can set the base scores of the respective tables in the database and the base scores of the fields of the respective tables according to a user-specified rule and a correlation relation among the respective tables in the database, and can set the base score of at least one action allowed to be executed on the database according to a user's setting. For example, the base score setting apparatus 301 can set base scores of a table or a field included in the user-specified rule, and a table in the database which has a correlation relation with the table and a field thereof to a first base score, and set base scores of remaining tables in the database and fields thereof to a second base score which is smaller than the first base score. Here, the correlation relation refers to a correlation relation formed by correlating two tables via a foreign key, or a correlation relation formed by two tables which appear in a same historical SQL statement executed on the database and are correlated via at least one field.

Optionally, the base score setting apparatus 301 can further set a weighting factor applied to a base score of a field based on a position of the field in the SQL statement, and then stores the weighting factor in the base score table. For example, if the field is located in a conditional region of the SQL statement, the base score setting apparatus 301 can increase the base score of the field, for example, apply a weighting factor greater than 1 to the base score, and when the field is located in a region other than the conditional region of the SQL statement, the base score setting apparatus 301 can keep the base score of the field unchanged, for example, apply a weighting factor equal to 1 to the base score.

The storing apparatus 302 can be any storing apparatus known in the art, and can be used to store the base score table generated by the base score setting apparatus.

The extracting apparatus 303 can extract a plurality of elements in the SQL statement to be executed on the database. In the embodiment of the present invention, the plurality of elements include at least one of a table and a field in the database which the SQL statement is directed at, and an action to be executed by the SQL statement. The extracting apparatus 303 can analyze a structure of the SQL statement according to the SQL syntax specification, so as to extract the plurality of elements in the SQL statement. Here, a detailed description of the extraction manner is omitted.

The calculating apparatus 304 can calculate a score of the SQL statement based on the correlation relation among the respective elements in the plurality of extracted elements of the SQL statement and the base scores of the respective elements.

Specifically, first of all, the calculating apparatus 304 can look up the base score table to determine respective base scores of the plurality of elements. For the table and the action involved in the SQL statement, the calculating apparatus 304 can determine the base scores obtained by looking up the base score table as their base scores. For the field involved in the SQL statement, if the above weighting factor is stored in the base score table, the calculating apparatus 304 can determine a product of the base score of the field obtained by looking up the base score table and its weighting factor as the base score of the field; on the contrary, if the above weighting factor is not stored in the base score table, the calculating apparatus 304 can determine the base score obtained by looking up the base score table as the base score of the filed directly.

Then, the calculating apparatus 304 can determine whether there is a correlation relation between any two of the respective elements. In the embodiment of the present invention, the calculating apparatus 304 can determine whether there is the correlation relation between any two tables, any two fields, and a table and a field involved in the SQL statement in the manner described above, so as to determine whether there is the correlation relation between any two elements of the SQL statement. If the correlation relation does not exist between any two elements of the SQL statement, i.e., the respective elements of the SQL statement are independent of each other, the calculating apparatus 304 can set the score of the SQL statement to a first value which may be a maximum one of the base scores of the respective elements. On the other hand, if the correlation relation exists between at least two elements of the SQL statement, the calculating means 304 can set the score of the SQL statement to a second value which is greater than the first value (namely, the maximum one of the base scores of the respective elements) to indicate that the SQL statement corresponding to such a case has greater criticality. The calculating apparatus 304 can set the second score in any of the manners described above (e.g., by using the equation described above).

The determining apparatus 305 can determine the criticality of the SQL statement based on the score of the SQL statement. Specifically, the determining apparatus 305 can compare the score of the SQL statement with a threshold value(s) preset by the database administrator to determine the criticality of the SQL statement. For example, in a case where one threshold value is set, when the score of the SQL statement is greater than the threshold value, the determining apparatus 305 can determine the SQL statement to be critical, otherwise the determining apparatus 305 can determine the SQL statement to be not critical. In a case where a plurality of threshold values are set, the determining apparatus 305 can determine the criticality of the SQL statement hieratically based on which two thresholds the score of the SQL statement falls between.

Thus, the criticality of the SQL statement can be determined by using the above device, so that a corresponding action can be performed subsequently according to the criticality of the SQL statement to ensure the security of data in the database.

The method and the device for determining criticality of a SQL statement according to the embodiments of the present invention have been described above. By using the method and the device, the SQL statement can be scored by using the base scores of the respective elements in accordance with characteristics of the SQL statement per se, and then it may be determined whether the SQL statement is critical based on its score, where the base scores of the respective elements can be predetermined according to a small number of rules defined by the user, characteristics of the database per se, and historical SQL statements executed on the database. In this way, the database administrator only needs to define the small number of rules according to his own needs. In the meantime, the method and the device according to the above aspects of the present invention can automatically analyze a received simple or complex SQL statement according to the small number of rules defined by the user so as to determine its criticality, without missing any critical SQL statement, and thereby protect the security of data in the database.

It is to be noted that the aforesaid method and device according to the embodiments of the present invention are only illustrative, not limitative, and various modifications can be made thereto by those of ordinary skill in the art according to their needs, without departing from the scope and spirit of the invention. For example, although the term "database administrator" is used in the above, it may be generalized to "a user of database". In addition, although the aforesaid device comprises the base score setting apparatus 301, the apparatus can be omitted, and in this case, the above device 300 does not set the base scores, but can receive a base score table which has been set in advance from outside, and store it in the storing apparatus 302 for use by the calculating apparatus 303.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory coupled to the processor, for determining criticality of a Structured Query Language (SQL) statement, comprising:
    extracting, by an extracting apparatus in a criticality determining device executed by the processor, a plurality of elements in the SQL statement;
    calculating, by a calculating apparatus in the criticality determining device executed by the processor, a score of the SQL statement based on a correlation relation among respective elements in the plurality of elements and base scores of the respective elements, wherein calculating the score of the SQL statement based on a correlation relation among respective elements in the plurality of elements and base scores of the respective elements includes:
        determining, by the calculating apparatus in the criticality determining device executed by the processor, the score of the SQL statement as a first value in response to that the correlation relation does not exist between any two of the plurality of elements, the first value being a maximum one of the respective base scores of the plurality of elements; and
        determining, by the calculating apparatus in the criticality determining device executed by the processor, the score of the SQL statement as a second value in response to that the correlation relation exists between at least two of the plurality of elements, the second value being greater than the maximum one of the respective base scores of the plurality of elements; and
    determining, by a determining apparatus in the criticality determining device executed by the processor, the criticality of the SQL statement based on the score of the SQL statement.

2. The method of claim 1, wherein the plurality of elements include at least one of a table and a field in a database which the SQL statement is directed at, and an action to be executed by the SQL statement.

3. The method of claim 1, wherein the base scores of the respective elements are obtained by referencing a base score table, the base score table including base scores of respective tables stored in the database, base scores of fields of the respective tables, and base scores of actions allowed to be executed on the database.

4. The method of claim 3, wherein the base scores of the respective tables and the base scores of the fields of the respective tables are determined according to a user-specified rule and a correlation relation among the respective tables in the database, the correlation relation referring to a correlation relation formed by correlating two tables via a foreign key, or a correlation relation formed by two tables which appear in a same historical SQL statement executed on the database and are correlated via at least one field.

5. The method of claim 4, wherein a table or a field included in the user-specified rule, and a table in the database, which has the correlation relation with the table, and a field thereof have a first base score, and a remaining table in the database and a field thereof have a second base score which is smaller than the first base score.

6. The method of claim 3, wherein the base score table further includes a weighting factor applied to a base score of a field based on a position of the field in the SQL statement.

7. The method of claim 6, wherein the weighting factor applied to the base score of the field is increased in response to the field being located in a conditional region of the SQL statement.

8. The method according to claim 1, wherein determining the criticality of the SQL statement based on the score of the SQL statement includes:
    comparing, by the determining apparatus in the criticality determining device executed by the processor, the score of the SQL statement with a threshold value; and
    determining, by the determining apparatus in the criticality determining device executed by the processor, the SQL statement to be critical in response to the score of the SQL statement being greater than the threshold value.

9. A device for determining criticality of a Structured Query Language (SQL) statement, comprising:
    a processor; and
    a memory coupled to the processor, wherein the memory comprises instructions which, when executed by the processor, cause the processor to:
    extract a plurality of elements in the SQL statement;
    calculate a score of the SQL statement based on a correlation relation among respective elements in the plurality of elements and base scores of the respective elements, wherein the instructions to calculate the score of the SQL statement based on a correlation relation among respective elements in the plurality of elements and base scores of the respective elements further causes the processor to:

determine the score of the SQL statement as a first value in response to that the correlation relation does not exist between any two of the plurality of elements, the first value being a maximum one of the respective base scores of the plurality of elements; and determine the score of the SQL statement as a second value in response to that the correlation relation exists between at least two of the plurality of elements, the second value being greater than the maximum one of the respective base scores of the plurality of elements; and determine the criticality of the SQL statement based on the score of the SQL statement.

10. The device of claim 9, wherein the plurality of elements include at least one of a table and a field in a database which the SQL statement is directed at, and an action to be executed by the SQL statement.

11. The device of claim 9, wherein the calculating apparatus obtains the base scores of the respective elements by referencing a base score table, the base score table including base scores of respective tables stored in the database, base scores of fields of the respective tables, and base scores of actions allowed to be executed on the database.

12. The device of claim 11, wherein the base scores of the respective tables and the base scores of the fields of the respective tables are determined according to a user-specified rule and a correlation relation among the respective tables in the database, the correlation relation referring to a correlation relation formed by correlating two tables via a foreign key, or a correlation relation formed by two tables which appear in a same historical SQL statement executed on the database and are correlated via at least one field.

13. The device of claim 12, wherein a table or a field included in the user-specified rule, and a table in the database, which has the correlation relation with the table, and a field thereof have a first base score, and a remaining table in the database and a field thereof have a second base score which is smaller than the first base score.

14. The device of claim 11, wherein the base score table further includes a weighting factor applied to a base score of a field based on a position of the field in the SQL statement.

15. The device of claim 14, wherein the weighting factor applied to the base score of the field is increased in response to the field being located in a conditional region of the SQL statement.

16. The device according to claim 9, wherein the instructions to determine the criticality of the SQL statement based on the score of the SQL statement further causes the processor to:

compare the score of the SQL statement with a threshold value; and determine the SQL statement to be critical in response to the score of the SQL statement being greater than the threshold value.

17. A computer program product comprising a non-transitory computer readable storage medium having a computer readable program stored therein, wherein the computer readable program, when executed on a computing device, causes the computing device to:

extract a plurality of elements in a Structured Query Language (SQL) statement;

calculate a score of the SQL statement based on a correlation relation among respective elements in the plurality of elements and base scores of the respective elements, wherein the computer readable program to calculate the score of the SQL statement based on a correlation relation among respective elements in the plurality of elements and base scores of the respective elements further causes the computing device to:

determine the score of the SQL statement as a first value in response to that the correlation relation does not exist between any two of the plurality of elements, the first value being a maximum one of the respective base scores of the plurality of elements; and determine the score of the SQL statement as a second value in response to that the correlation relation exists between at least two of the plurality of elements, the second value being greater than the maximum one of the respective base scores of the plurality of elements; and determine the criticality of the SQL statement based on the score of the SQL statement.

18. The computer program product of claim 17, wherein the plurality of elements include at least one of a table and a field in a database which the SQL statement is directed at, and an action to be executed by the SQL statement.

* * * * *